United States Patent
Lee et al.

(10) Patent No.: US 11,336,905 B2
(45) Date of Patent: May 17, 2022

(54) STORING INDEX INFORMATION FOR PIXEL COMBINATIONS WITH SIMILARITY TO A PIXEL TO REPLACE THE PIXEL INFORMATION

(71) Applicant: SAMSUNG ELECTRONICS CO., LTD., Suwon-si (KR)

(72) Inventors: Jaemoon Lee, Suwon-si (KR); Minhoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 16/741,990

(22) Filed: Jan. 14, 2020

(65) Prior Publication Data

US 2020/0228808 A1 Jul. 16, 2020

(30) Foreign Application Priority Data

Jan. 14, 2019 (KR) .................. 10-2019-0004770

(51) Int. Cl.
*H04N 19/186* (2014.01)
*H04N 19/423* (2014.01)

(52) U.S. Cl.
CPC ......... *H04N 19/186* (2014.11); *H04N 19/423* (2014.11)

(58) Field of Classification Search
CPC .. H04N 19/186; H04N 19/423; H04N 19/593; H04N 19/46; H04N 19/182; H04N 9/7973; H04N 9/8042; H04N 19/70
(Continued)

(56) References Cited

U.S. PATENT DOCUMENTS 5,684,895 A 11/1997 Harrington
5,915,077 A 6/1999 Kulkarni et al.
(Continued)

FOREIGN PATENT DOCUMENTS

EP 2960861 A1 12/2015
EP 2 983 360 2/2016
(Continued)

OTHER PUBLICATIONS

Search Report and Written Opinion dated May 4, 2020 in counterpart International Patent Application No. PCT/KR2020/000661.
(Continued)

*Primary Examiner* — Marnie A Matt
(74) *Attorney, Agent, or Firm* — Nixon & Vanderhye P.C.

(57) ABSTRACT

An electronic apparatus includes: a storage and a processor. The processor is configured to: select a second pixel having a similarity to a first pixel equal to or greater than a threshold value among neighboring pixels based on a first chrominance signal of the first pixel and second chrominance signals of pixels neighboring the first pixel among a plurality of pixels included in an input image, identify index information corresponding to a pixel combination having a highest similarity to the first pixel based on a first luminance signal of the first pixel, a second luminance signal of the second pixel, and a plurality of pixel combinations with respect to the first pixel, and control the electronic apparatus to store the image by replacing a pixel value of the first pixel with the identified index information.

20 Claims, 11 Drawing Sheets

(58) Field of Classification Search
USPC .......................................................... 382/103
See application file for complete search history.

(56) References Cited

U.S. PATENT DOCUMENTS

| | | | |
|---|---|---|---|
| 6,205,255 B1* | 3/2001 | Mak | G06T 9/005 |
| | | | 382/166 |
| 8,174,615 B2 | 5/2012 | Wilde et al. | |
| 8,854,383 B2 | 10/2014 | Tsai et al. | |
| 9,769,496 B2 | 9/2017 | Wada | |
| 10,298,945 B2* | 5/2019 | Matsuo | H04N 19/17 |
| 2003/0048944 A1* | 3/2003 | De Bonet | H04N 19/593 |
| | | | 382/166 |
| 2004/0126034 A1 | 7/2004 | Yu et al. | |
| 2006/0002467 A1 | 1/2006 | Haskell et al. | |
| 2012/0262493 A1* | 10/2012 | Tsai | G06T 15/005 |
| | | | 345/667 |
| 2013/0170554 A1 | 7/2013 | Matsuo et al. | |
| 2017/0289541 A1* | 10/2017 | Miyoshi | H04N 19/14 |
| 2017/0345187 A1* | 11/2017 | Sato | H04N 19/105 |
| 2019/0387254 A1* | 12/2019 | An | H04N 19/82 |

FOREIGN PATENT DOCUMENTS

| | | |
|---|---|---|
| KR | 10-2015-0075382 | 7/2015 |
| KR | 10-1639852 | 7/2016 |
| WO | 2016/186551 | 11/2016 |

OTHER PUBLICATIONS

Extended European Search Report dated Dec. 22, 2021 for EP Application No. 20740908.7.

\* cited by examiner

Index : 1

Index : 2

Index : 3

Index : 4

Index : 5

Index : 6

Index : 7

Index : 8

Index : 9

Index : 10

FIG. 6

STORING INDEX INFORMATION FOR PIXEL COMBINATIONS WITH SIMILARITY TO A PIXEL TO REPLACE THE PIXEL INFORMATION

CROSS-REFERENCE TO RELATED APPLICATION

This application is based on and claims priority under 35 U.S.C. § 119 to Korean Patent Application No. 10-2019-0004770, filed in the Korean Intellectual Property Office on Jan. 14, 2019, the disclosure of which is incorporated by reference herein in its entirety.

BACKGROUND

1. Field

The disclosure relates to an electronic apparatus and a control method thereof and, for example, to an electronic apparatus which encodes an image and a control method thereof.

2. Description of Related Art

Various types of electronic apparatuses have been developed and have proliferated along the development of electronic technologies.

Particularly, as a resolution and image quality of an image provided through an electronic apparatus gradually increase, capacity of a memory and a bandwidth required for providing an image have also increased geometrically.

There has been intensive research regarding an image compression method for providing a high-resolution and high-quality image by efficiently using limited resources of capacity of a memory and a bandwidth.

In the related art, a lossless image compression apparatus has been used for minimizing loss of image quality, but in the lossless image compression, a compression rate was not constant and it was substantially slightly insufficient to efficiently use limited resources of a memory (e.g., hardware).

There is need of an image compression method of efficiently using limited hardware resources, while maintaining a constant compression rate and minimizing loss of image quality.

SUMMARY

Embodiments of the disclosure address the above-described needs, and the disclosure provides an electronic apparatus which executes encoding by considering chrominance signals and luminance signals of pixels and a control method thereof.

According to an example embodiment of the disclosure, an electronic apparatus includes: a storage configured to store index information indicating each of a plurality of pixel combinations obtainable based on neighboring pixels with respect to a pixel, and a processor configured to select at least one second pixel having a similarity to a first pixel equal to or greater than a threshold value from among the neighboring pixels based on a first chrominance signal of the first pixel and second chrominance signals of pixels neighboring the first pixel among a plurality of pixels included in an input image, identify index information corresponding to a pixel combination having a highest similarity to the first pixel based on a first luminance signal of the first pixel, a second luminance signal of at least one second pixel, and a plurality of pixel combinations with respect to the first pixel, and to control the electronic apparatus to store the image by replacing a pixel value of the first pixel with the identified index information.

The processor may obtain a plurality of luminance signals according to the plurality of pixel combinations based on the at least one second pixel, identify a luminance signal having a lowest difference value from the first luminance signal of the first pixel among the plurality of luminance signals, and encode the input image by replacing a pixel value of the first pixel with the index information corresponding to the identified luminance signal. The processor may obtain a second luminance signal of each of the second pixels and an average luminance signal of the plurality of second pixels as the plurality of luminance signals.

The processor may obtain information indicating a pixel combination for obtaining the identified luminance signal based on the index information, and replace a pixel value of the first pixel with the information.

The neighboring pixels may include a plurality of second pixels located on upper, lower, right, and left sides or in diagonal directions with respect to the first pixel.

Based on the plurality of second pixels having a similarity equal to or greater than a threshold value including four pixels, the processor may obtain an average luminance signal of the four second pixels, an average luminance signal of three second pixels among the four second pixels, an average luminance signal of two second pixels among the four second pixels, and a luminance signal corresponding to each of the four second pixels, as the plurality of luminance signals, and the index information may include information indicating each of the plurality of pixel combinations, wherein the plurality of pixel combinations are not more than 15.

The processor may obtain a third chrominance signal and a third luminance signal of a third pixel spaced apart from the first pixel by one pixel, identify at least one fourth pixel based on the third chrominance signal and fourth chrominance signals of pixels neighboring to the third pixels, obtain a plurality of luminance signals according to the plurality of pixel combinations based on the at least one fourth pixel, identify a luminance signal having a minimum difference value from the third luminance signal among the plurality of luminance signals, and replace a pixel value of the third pixel with information indicating a pixel combination for obtaining the identified luminance signal.

When a number of pixels neighboring to the third pixel is less than 3, the processor may maintain the pixel value of the third pixel.

The processor may obtain 32-bit αRGB information corresponding to each of the neighboring pixels, and obtain 28-bit αRGB information by applying gradation conversion to each of the αRGB information, the second chrominance signals and the second luminance signals corresponding to the neighboring pixels may be αYCbCr information obtained based on the 28-bit αRGB information, and the index information may be 4-bit information indicating a pixel combination having a highest similarity to the first pixel.

According to an example embodiment of the disclosure, an electronic apparatus includes: a storage configured to store an encoded image, and a processor configured to: identify a pixel including index information among a plurality of pixels included in the encoded image, identify at least one neighboring pixel among pixels neighboring the pixel based on the index information, obtain a pixel value of the pixel based on chrominance information and luminance information obtained from the at least one identified neighboring pixel, and decode the encoded image by replacing the index information with the pixel value.

The index information may be information indicating any one combination among a plurality of pixel combinations obtainable based on the neighboring pixels.

According to an example embodiment of the disclosure, a method of controlling an electronic apparatus including index information indicating each of a plurality of pixel combinations obtainable based on neighboring pixels with respect to a pixel, the method including: selecting at least one second pixel having a similarity to a first pixel equal to or greater than a threshold value among the neighboring pixels based on a first chrominance signal of the first pixel and second chrominance signals of pixels neighboring the first pixel among a plurality of pixels included in an image, identifying index information corresponding to a pixel combination having a highest similarity to the first pixel based on a first luminance signal of the first pixel, a second luminance signal of the at least one second pixel, and a plurality of pixel combinations with respect to the first pixel, and storing the image by replacing a pixel value of the first pixel with the identified index information.

The identifying index information may include obtaining a plurality of luminance signals according to the plurality of pixel combinations based on the at least one second pixel, and identifying a bright signal having a lowest difference value from the first luminance signal of the first pixel among the plurality of luminance signals, the storing the image may include storing the image by replacing a pixel value of the first pixel with the index information corresponding to the identified luminance signal.

The obtaining a plurality of luminance signals may include obtaining a second luminance signal of each of the second pixels and an average luminance signal of the plurality of second pixels as the plurality of luminance signals.

The identifying index information may include obtaining information indicating a pixel combination for obtaining the identified luminance signal based on the index information.

The neighboring pixels may include a plurality of second pixels located on upper, lower, right, and left sides or in diagonal directions with respect to the first pixel.

The obtaining a plurality of luminance signals may include, based on the plurality of second pixels having a similarity equal to or greater than a threshold value including four pixels, obtaining an average luminance signal of the four second pixels, an average luminance signal of three second pixels among the four second pixels, an average luminance signal of two second pixels among the four second pixels, and a luminance signal corresponding to each of the four second pixels, as the plurality of luminance signals, and the index information may be information indicating each of the plurality of pixel combinations wherein the plurality of pixel combinations are not more than 15.

The method may further include obtaining a third chrominance signal and a third luminance signal of a third pixel spaced apart from the first pixel by one pixel, identifying at least one fourth pixel based on the third chrominance signal and fourth chrominance signals of pixels neighboring the third pixels, obtaining a plurality of luminance signals according to the plurality of pixel combinations based on the at least one fourth pixel, identifying a luminance signal having a lowest difference value from the third luminance signal among the plurality of luminance signals, and replacing a pixel value of the third pixel with information indicating a pixel combination for obtaining the identified luminance signal.

When a number of pixels neighboring to the third pixel is less than 3, maintaining the pixel value of the third pixel may be included.

The method may further include obtaining 32-bit αRGB information corresponding to each of the neighboring pixels, and obtaining 28-bit αRGB information by applying gradation conversion to each of the αRGB information, and the second chrominance signals and the second luminance signals corresponding to the neighboring pixels may be αYCbCr information obtained based on the 28-bit αRGB information, and the index information may be 4-bit information indicating a pixel combination having a highest similarity to the first pixel.

As described above, according to various example embodiments of the disclosure, an image may be encoded at a high compression rate and loss of image quality of an original image due to the compression may be minimized and/or reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a diagram illustrating an example of encoding according to another embodiment;

DETAILED DESCRIPTION

Figure 1:
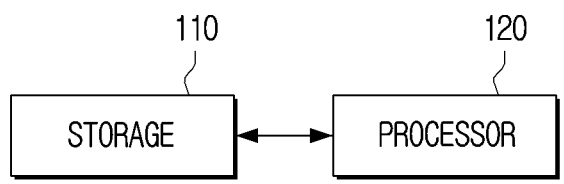
FIG. 1 is a block diagram illustrating an example configuration of an electronic apparatus according to an embodiment.

Hereinafter, the disclosure will be described in greater detail with reference to the accompanying drawings.

The terms used in describing the various example embodiments of the disclosure have been selected as widely used general terms in consideration of functions in the disclosure, but these may vary in accordance with the intention or precedent of the person skilled in the art, the emergence of new technologies and the like. In addition, in a certain case, term may be arbitrarily selected, in which case the meaning will be described in the disclosure. Therefore, the terms used in the disclosure should be defined based on the meanings of the terms and the contents throughout the disclosure, rather than the names of the simple terms.

In this disclosure, the expressions "have," "may have," "include," or "may include" or the like represent presence of a corresponding feature (for example, components such as numbers, functions, operations, or parts) and does not exclude the presence of additional feature.

Expressions such as "at least one of A [and/or] B" should be understood to express "A", "B", or any one of "A and B".

The terms "first", "second", and the like used in this disclosure may be simply used to describe various components, regardless of an order and/or importance, and may be used to distinguish one component from another, and do not limit components.

If it is described that a certain element (e.g., first element) is "operatively or communicatively coupled with/to" or is "connected to" another element (e.g., second element), it should be understood that the certain element may be connected to the other element directly or through still another element (e.g., third element).

Singular expressions include plural expressions, unless the context clearly indicates otherwise. It is to be understood that the terms such as "comprise" or "consist of" are used herein to designate a presence of characteristic, numbers, operations, components, parts, or a combination thereof, and not to preclude a presence or a possibility of adding one or more of other characteristics, numbers, operations, components, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not shown). A processor, as used herein, may include one or more processors (e.g., one or more programmed microprocessors and associated circuitry), and may be referred to herein as processing circuitry.

In the disclosure, a user may be referred to as a person who uses an electronic apparatus or an apparatus (e.g., artificial intelligence electronic apparatus) which uses an electronic apparatus.

Hereinafter, various example embodiments of the disclosure will be described in greater detail with reference to the accompanying drawings.

FIG. 1 is a block diagram illustrating an example configuration of an electronic apparatus according to an embodiment of the disclosure.

An electronic apparatus 100 may be implemented as an apparatus having a display function such as, for example, and without limitation, a TV, a smart phone, a tablet PC, a PMP, a PDA, a notebook PC, a smart watch, a head mounted display (HMD), a near eye display (NED), or the like. The electronic apparatus 100 may include a display in various forms to provide a display function.

Various embodiments of the disclosure may be implemented as an electronic apparatus not having a display function. For example, various embodiments of the disclosure may be implemented as various types of electronic apparatuses providing an image to an external apparatus such as, for example, and without limitation, a Blu-ray player, a digital versatile disc (DVD) player, a streaming content output apparatus, a set-top box, or the like. As another example, various embodiments of the disclosure may be implemented as various types of home appliances such as, for example, and without limitation, a speaker, a refrigerator, a washing machine, an air conditioner, an air cleaner, internet of things device, or the like.

The electronic apparatus 100 according to an embodiment of the disclosure may receive an image by executing communication with an external apparatus. The image may include various types of images such as, for example, and without limitation, a still image, a video, a 2D or 3D image, and the like. The image according to various embodiments of the disclosure is not limited to an image received from the outside. As another example, an image may be stored in a storage 110 included in the electronic apparatus 100 or an image stored in the storage 110 may be opened. As another example, the electronic apparatus 100 may receive an image from an external storage apparatus through wired or wireless communication.

Referring to FIG. 1, the electronic apparatus 100 includes a storage 110 and a processor (e.g., including processing circuitry) 120.

The storage 110 may store an operation system (O/S) software module for driving the electronic apparatus 100 and various pieces of data such as various multimedia contents. For example, the storage 110 may store index information indicating each of a plurality of pixel combinations obtainable based on neighboring pixels with respect to one pixel among a plurality of pixels configuring an image. The plurality of pixels included in the image will be described below with reference to FIG. 3.

Figure 3:
FIG. 3 is a diagram illustrating an example of a plurality of pixels included in an image according to an embodiment.

FIG. 3 is a diagram illustrating an example of a plurality of pixels included in an image according to an embodiment of the disclosure.

Referring to FIG. 3, one pixel is illustrated as one block. A number of expressible colors of each of pixels included in an image according to an embodiment of the disclosure is proportional to bits of a pixel value. As an example, a pixel value of k bits may express $2^k$ colors. For example, a pixel value of 24 bits with R (red), G (green), B (blue) each having 8 bits may be express $2^{24}$ (16,777,216) colors. As another example, a pixel value of 32 bits with $\alpha$, R, G, and B each having 8 bits may express $2^{32}$ (16,777,216+$\alpha$ channel having 8 bits) colors. $\alpha$ channel may be a value expressing a transparency, a projection degree, or the like.

Hereinafter, for convenience of description, the description will be made by assuming a case where each of a plurality of pixels included in an image include a pixel value of 32 bits. However, it will be understood that this is merely an example and there is no limitation thereto. As an example, a pixel may have a pixel value expressible $2^{30}$ (1,073,741,824) colors with R, G, B each having 10 bits.

The storage 110 according to an embodiment of the disclosure may store index information indicating each of a plurality of pixel combinations obtainable based on neighboring pixels with respect to a pixel. For example, the number of pixel combinations obtainable from four neighboring pixels located on upper, lower, right, and left sides with respect to a certain pixel may, for example, be 15 in total ($_4C_4+_4C_3+_4C_2+_4C_1=15$). Each index information may be information indicating any one pixel combination among the 15 combinations in total. As an example, index information 'index: 1' may be information indicating a combination based on a pixel located on an upper side with respect to a certain pixel among four pixels. As another example, index information 'index: 15' may be information indicating a combination based on four pixels located on upper, lower, right, and left sides with respect to a certain pixel. This is merely an embodiment and there is no limitation thereto. This will be described in detail with reference to FIGS. 4A, 4B and 4C.

As another example, index information may be information indicating any one of 15 pixel combinations in total obtainable from four pixels located in diagonal directions with respect to a certain pixel.

Returning to FIG. 1, the electronic apparatus 100 according to an embodiment of the disclosure includes a processor 120.

The processor 120 may include various processing circuitry and may control general operations of the electronic apparatus 100.

The processor 120 may be implemented, for example, and without limitation, as a digital signal processor (DSP), a microprocessor (e.g., one or more programmed microprocessors and associated circuitry), a time controller (TCON), or the like, which processes digital signals. However, there is no limitation thereto, and the processor 120 may include, for example, and without limitation, one or more of a central processing unit (CPU), a micro controller unit (MCU), a micro processing unit (MPU), a controller, an application processor (AP), a graphics-processing unit (GPU), a communication processor (CP), an ARM processor, or the like. In addition, the processor 120 may be implemented as a system on chip (SoC) or a large scale integration (LSI) with embedded processing algorithm or implemented in a form of a field programmable gate array (FPGA). The processor 120 may execute various functions by executing computer executable instructions stored in the storage 110.

For example, the processor 120 according to an embodiment of the disclosure may obtain a chrominance signal and a luminance signal based on a pixel value of each of a plurality of pixels included in an image.

Referring to FIG. 3, the processor 120 may obtain a first luminance signal and first chrominance signals in a YCbCr (or YUV) format based on αRGB having a pixel value of a first pixel 10. For example, Y may refer, for example, to the first luminance signal as a luminance and brightness of a pixel, and Cb and Cr may refer, for example, to the first chrominance signals as chrominance. The chrominance signals Cb and Cr may refer, for example, to signals obtained by removing a luminance signal (Y) from R, G, and B components according to pixel values. For example, Cr may be a signal R-Y (Cr=(R-Y)) and Cb may be a signal B-Y (Cb=(B-Y)). The luminance signal and the chrominance signals in the YCbCr format are merely an example and there is no limitation thereto. The processor 120 according to an embodiment may obtain a luminance signal and a chrominance signal using various color spaces expressible luminance and colors.

The processor 120 according to an embodiment of the disclosure may obtain second chrominance signals of pixels neighboring to the first pixel 10. For example, the processor 120 may obtain a second chrominance signal corresponding to each of a plurality of second pixels located on upper, lower, right, and left sides with respect to the first pixel 10. As another example, the processor 120 may obtain a second chrominance signal corresponding to each of a plurality of second pixels located in diagonal directions with respect to the first pixel 10.

Returning to FIG. 1, the processor 120 according to an embodiment of the disclosure may identify a similarity between the first chrominance signal and the second chrominance signal, and select (or identify) at least one second pixel having a similarity equal to or greater than a threshold value among pixels neighboring to the first pixel 10. For example, the processor 120 may select at least one second pixel having a similarity equal to or greater than a threshold value using a similarity measuring method based on a distance between the first chrominance signal and the second chrominance signal. As an example, the processor 120 may calculate the Euclidean distance between the first chrominance signal and the second chrominance signal in Cb and Cr color spaces, and determine that the first chrominance signal and the second chrominance signal are similar to each other based on the calculated distance being less than a threshold value. Various similarity measuring methods may be used, and the disclosure is not limited to the foregoing method.

The processor 120 according to an embodiment of the disclosure may identify index information corresponding to a pixel combination having a highest similarity to the first pixel based on the first luminance signal of the first pixel 10, a second luminance signal of at least one selected second pixel, and a plurality of pixel combinations with respect to the first pixel. This will be described in greater detail below with reference to FIGS. 4A, 4B and 4C.

Figure 4A:
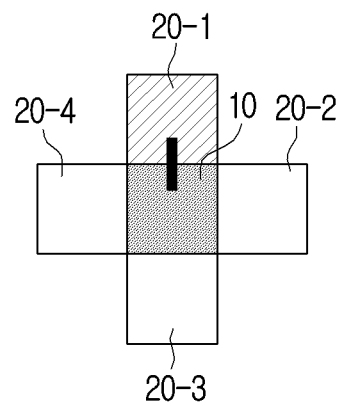
FIG. 4A is a diagram illustrating example index information according to an embodiment.
Figure 4A:
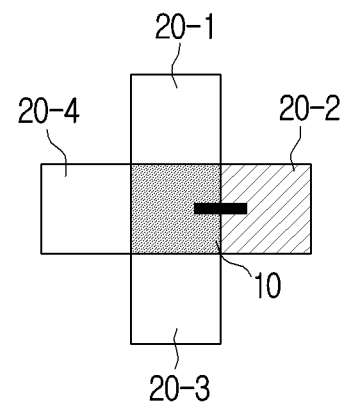
Figure 4A:
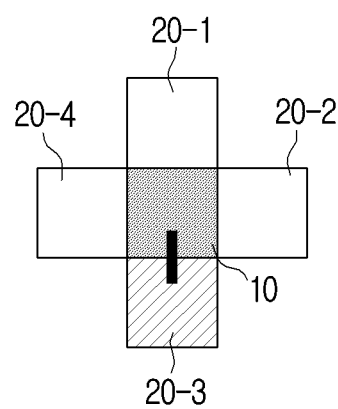
Figure 4A:
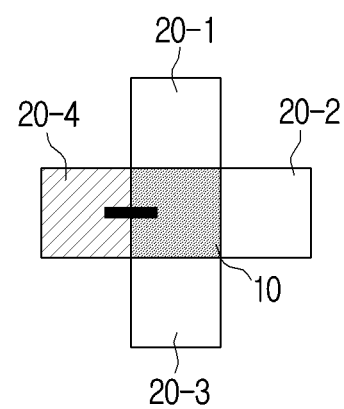
Figure 4B:
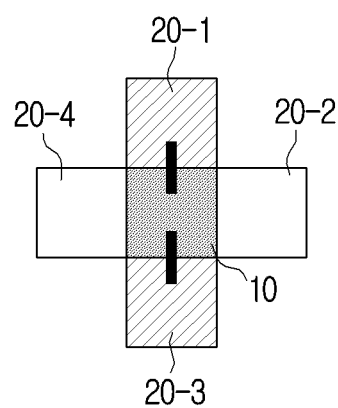
FIG. 4B is a diagram illustrating example index information according to an embodiment.
Figure 4B:
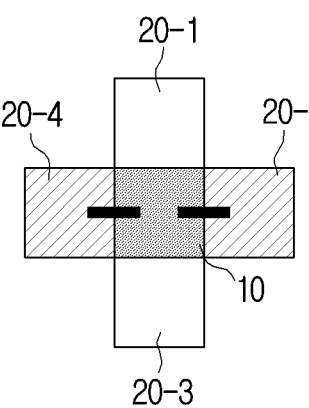
Figure 4B:
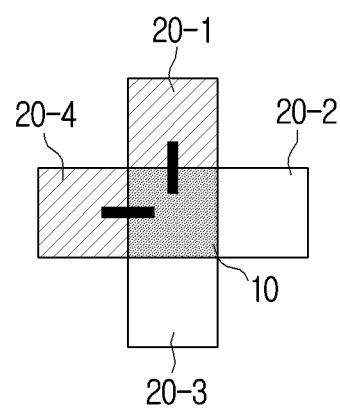
Figure 4B:
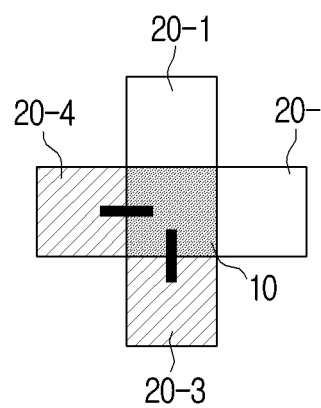
Figure 4B:
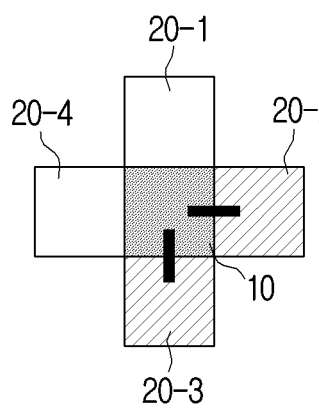
Figure 4B:
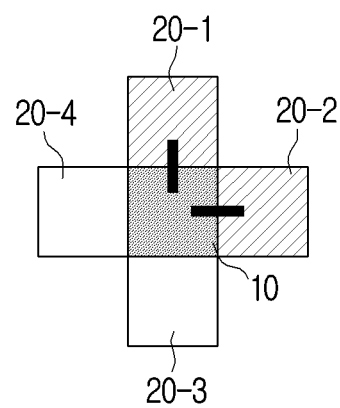
Figure 4C:
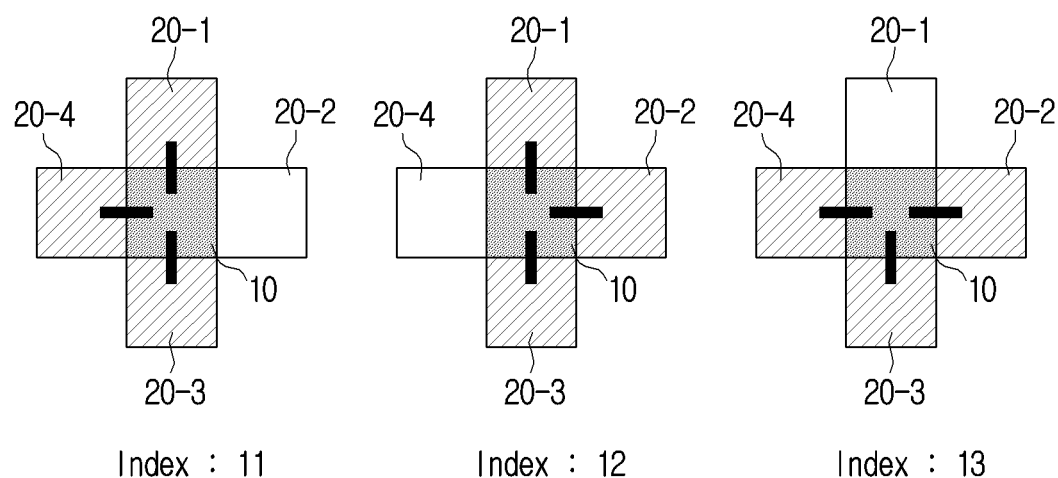
FIG. 4C is a diagram illustrating example index information according to an embodiment.
Figure 4C:
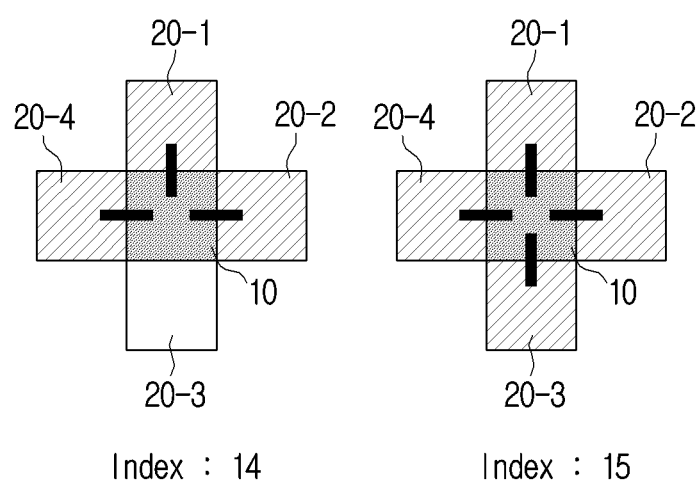

FIGS. 4A, 4B and 4C are diagrams illustrating example index information according to an embodiment of the disclosure.

Referring to FIG. 4A, the processor 120 may identify a similarity between the first chrominance signal corresponding to the first pixel 10 and the second chrominance signal of each of pixels located on upper, lower, right, and left sides with respect to the first pixel 10. The processor 120 may obtain at least one second pixel 20 having a similarity equal to or more than a threshold value among the four pixels. As an example, all of the pixels located on upper, lower, right, and left sides with respect to the first pixel 10 may be assumed to have a similarity equal to or more than a threshold value. In this case, the processor 120 may obtain a plurality of pixel combinations using a second pixel 20-1 located on an upper side, a second pixel 20-2 located on a right side, a second pixel 20-3 located at a lower side, and a second pixel 20-4 located at a left side with respect to the first pixel 10. The processor 120 may identify a pixel combination having a highest similarity to the first pixel 10 based on the first luminance signal of the first pixel 10, the second luminance signal of at least one second pixel 20, and the plurality of pixel combinations.

For example, the processor 120 according to an embodiment of the disclosure may obtain the second luminance signal of each of the second pixels 20-1, 20-2, 20-3, and 20-4 and an average luminance signal of at least two pixels of the second pixels 20-1, 20-2, 20-3, and 20-4, as a plurality of luminance signals.

The processor 120 may identify a luminance signal having a lowest difference value from the first luminance signal of the first pixel 10 among the plurality of luminance signals.

FIG. 4A is a diagram illustrating example pixel combinations using one pixel among a plurality of pixel combinations obtainable based on neighboring pixels. Referring to FIG. 4A, index information of a pixel combination using the second pixel 20-1 located on an upper side with respect to the first pixel 10 may be 'index: 1'. Index information of a pixel combination using the second pixel 20-2 located on a right side with respect to the first pixel 10 may be 'index: 2'. Index information of a pixel combination using the second pixel 20-3 or 20-4 located on a lower side or a left side with respect to the first pixel 10 may be 'Index: 3' or 'Index: 4'. The processor 120 may apply index information to each of four pixel combinations ($_4C_1$) using one pixel among the four neighboring pixels. A pixel combination using two or more pixels among the neighboring pixels will be described in greater detail below with reference to FIGS. 4B and 4C.

FIG. 4B is a diagram illustrating example pixel combinations using two pixels among neighboring pixels with respect to the first pixel 10. Referring to FIG. 4B, index information of a pixel combination using the second pixel 20-1 located on an upper side and the second pixel 20-3 located on a lower side may be 'index: 5'. As another example, index information of a pixel combination using the second pixel 20-2 located on a right side and the second pixel 20-4 located on a left side with respect to the first pixel 10 may be 'index: 6'. Various other examples illustrated in FIG. 4B may include index information of a pixel combination using the second pixel 20-1 located on an upper side and the second pixel 20-4 located on a left side with respect to the first pixel 10 may be 'index 7', index information of a pixel combination using the second pixel 20-4 located on a left side and the second pixel 20-3 located on a lower side with respect to the first pixel 10 may be 'index 8', index information of a pixel combination using the second pixel 20-2 located on a right side and the second pixel 20-3 located on a lower side with respect to the first pixel 10 may be 'index 9', and index information of a pixel combination using the second pixel 20-1 located on an upper side and the second pixel 20-2 located on a right side with respect to the first pixel 10 may be 'index 10'.

The processor 120 may apply index information to each of six pixel combinations ($_4C_2$) using two pixels among the four neighboring pixels.

FIG. 4C is a diagram illustrating example pixel combinations using three or more pixels among neighboring pixels with respect to the first pixel 10. Referring to FIG. 4C, index information of a pixel combination using the second pixel 20-1 located on an upper side, the second pixel 20-3 located on a lower side, and the second pixel 20-4 located on a left side may be 'index: 11'. As another example, index information of a pixel combination using the second pixel 20-1 located on an upper side, the second pixel 20-2 located on a right side, and the second pixel 20-3 located on a lower side with respect to the first pixel 10 may be 'index: 12'. Various other examples illustrated in FIG. 4C may include index information of a pixel combination using the second pixel 20-2 located on a right side, the second pixel 20-3 located on a lower side, and the second pixel 20-4 located on a left side with respect to the first pixel may be 'index 13', index information of a pixel combination using the second pixel 20-2 located on a right side, the second pixel 20-1 located on an upper side, and the second pixel 20-4 located on a left side with respect to the first pixel may be 'index 14', and index information of a pixel combination using the second pixel 20-1 located on an upper side, the second pixel 20-2 located on a right side, the second pixel 20-3 located on a lower side, and the second pixel 20-4 located on a left side with respect to the first pixel may be 'index 15' (e.g., using all four neighboring second pixels).

The processor 120 may apply index information to each of four pixel combinations ($_4C_3$) using three pixels among the four neighboring pixels. In addition, the processor 120 may apply index information to each of one pixel combination ($_4C_4$) using four pixels among the four neighboring pixels.

Returning to FIG. 1, the processor 120 according to an embodiment of the disclosure may select at least one second pixel 20 having a similarity to the first pixel 10 equal to or greater than a threshold value based on the first chrominance signal of the first pixel 10 and the second chrominance signals of the pixels neighboring to the first pixel 10 on upper, lower, right, and left sides.

For example, all of the four pixels neighboring to the first pixel 10 on upper, lower, right, and left sides may be assumed to have a similarity to the first chrominance signal of the first pixel 10 equal to or greater than a threshold value. In this case, the processor 120 according to an embodiment of the disclosure may obtain luminance signals according to 15 pixel combinations in total, as shown in FIGS. 4A, 4B and 4C, based on the plurality of second pixels 20-1, 20-2, 20-3, and 20-4.

The processor 120 may identify a similarity between the first luminance signal of the first pixel 10 and the plurality of luminance signals obtained based on the second pixels.

As an example, as shown in FIG. 4A, the processor 120 may calculate a similarity between the first luminance signal of the first pixel 10 and the second luminance signal of the second pixel 20-1 located on an upper side, a similarity between the first luminance signal and the second luminance signal of the second pixel 20-2 located on a right side, a similarity between the first luminance signal and the second luminance signal of the second pixel 20-3 located on a lower side, and a similarity between the first luminance signal and the second luminance signal of the second pixel 20-4 located on a left side.

The processor 120 may determine a similarity between an average luminance signal of at least two pixels among the second pixels 20-1, 20-2, 20-3, and 20-4 and the first luminance signal.

Referring to FIG. 4B, the processor 120 may obtain an average luminance signal based on two pixels among the plurality of two pixels 20-1, 20-2, 20-3, and 20-4. As an example, the processor 120 may obtain an average luminance signal of the second pixel 20-1 located on an upper side and the second pixel 20-3 located on a lower side with respect to the first pixel 10. As shown in FIG. 4B, the processor 120 may obtain six average luminance signals in total of combinations ($_4C_2$) combinable from the four second pixels 20-1, 20-2, 20-3, and 20-4. This is merely an example and the four second pixels 20 located on upper, lower, right, and left sides of the first pixel 10 are assumed to include chrominance signals similar to that of the first pixel 10. When only some pixels among the plurality of pixels neighboring to the first pixel 10 include chrominance signals similar to that of the first pixel 10, the processor 120 may obtain a plurality of average luminance signals of combinations combinable using only some pixels. For example, when three pixels among the four pixels neighboring to the first pixel 10 include chrominance signals similar to that of the first pixel 10, the processor 120 may obtain an average luminance signal of two second pixels among the three second pixels 20. In this case, the processor 120 may obtain three average luminance signals in total of combinations ($_3C_2$) combinable from the three second pixels 20. The processor 120 may identify a similarity between the plurality of average luminance signals obtained and the first luminance signal of the first pixel 10.

The processor 120 may determine a similarity between an average luminance signals based on at least three or more pixels among the second pixels 20-1, 20-2, 20-3, and 20-4 and the first luminance signal.

Referring to FIG. 4C, the processor 120 may obtain an average luminance signal based on three pixels among the plurality of second pixels 20. As an example, the processor 120 may obtain an average luminance signal of the second pixel 20-1 located on an upper side, the second pixel 20-2 located on a right side, and the second pixel 20-3 located on a lower side with respect to the first pixel 10. In addition, as shown in FIG. 4C, the processor 120 may obtain an average luminance signal based on four pixels.

The processor 120 may identify a luminance signal having a highest similarity to the first luminance signal of the first pixel 10 among the 15 luminance signals in total obtained according to the plurality of pixel combinations. That is, the processor 120 may identify a pixel combination having a highest similarity to the first pixel 10 among the plurality of pixel combinations.

For example, as shown in FIG. 4C, when the average luminance signal of the four second pixels 20 has a lowest difference value from (or is most similar to) the first luminance signal of the first pixel 10, the processor 120 may identify index information indicating the combination based on the four pixels among the plurality of pixel combinations. As an example, the processor 120 may identify index information 'Index: 15' indicating the combination based on the four pixels located on upper, lower, right, and left sides. The processor 120 may replace a pixel value of the first pixel 10 with the identified index information 'index: 15'.

As another example, as shown in FIG. 4B, when the average luminance signal of the second pixel 20-2 located on a right side and the second pixel 20-4 located on a left side has a lowest difference value from (or is most similar to) the first luminance signal of the first pixel 10, the processor 120 may obtain 'index: 6' indicating the pixel combination based on the second pixel 20-2 located on a right side and the second pixel 20-4 located on a left side. The processor 120 may replace a pixel value of the first pixel 10 with the index information 'index: 6" and encode an input image.

The processor 120 according to an embodiment of the disclosure may identify a luminance signal most similar to the first luminance signal among the plurality of luminance signals. The processor 120 may obtain information indicating the corresponding pixel combination among pieces of index information stored in the storage 110 according to the pixel combination for obtaining the identified luminance signal. For example, as shown in FIG. 4A, the index information indicating the second pixel 20-1 located on an upper side may be 'index: 1'. When the luminance signal having a lowest difference value from the first luminance signal is the second luminance signal corresponding to the second pixel 20-1 located on an upper side, the processor 120 may obtain the index information 'index: 1'. The processor 120 may replace the pixel value of the first pixel 10 with the index information 'index: 1' and encode an input image.

The specific numerical values included in the index information, the types of the index information, and the like are merely an example and there is no limitation thereto. For example, the index information may include various types of information capable of specifying any one of neighboring pixels.

According to an embodiment of the disclosure, when all of the four second pixels 20 neighboring to the first pixel 10 include second chrominance signals having a similarity to the first chrominance signal equal to or greater than a threshold value, the processor 120 may obtain 15 luminance signals at most based on the second pixels 20.

The index information according to an embodiment of the disclosure may be implemented as data having a size of 4 bits ($2^4$=16) for indicating 15 pixel combinations at most.

The processor 120 according to an embodiment of the disclosure may replace the pixel value of the first pixel 10 having 32 bits with index information having 4 bits and encode an input image. As shown in FIG. 3, each of plurality of pixels in an input image has a pixel value of 32 bits, and an image encoded by the processor 120 may include a pixel value of 32 bits and index information having 4 bits. The encoded image may have, for example, a compression rate of 56.25% with respect to the input image.

Returning to FIG. 1, the pixels neighboring to the first pixel 10 according to an embodiment of the disclosure are not limited to the second pixels located on upper, lower, right, and left sides. As another example, the pixels neighboring to the first pixel 10 may refer, for example, to a plurality of second pixels 20 located in diagonal directions with respect to the first pixel 10.

Figure 5:
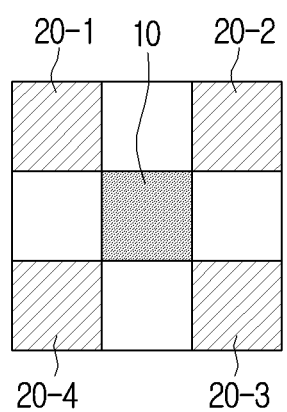
FIG. 5 is a diagram illustrating example neighboring pixels according to another embodiment.

FIG. 5 is a diagram illustrating example neighboring pixels according to another embodiment of the disclosure.

As shown in FIG. 5, the processor 120 according to an embodiment of the disclosure may obtain second chrominance signals corresponding to the plurality of second pixels 20 located in diagonal directions with respect to the first pixel 10. The processor 120 may identify a similarity between the first chrominance signal of the first pixel 10 and the second chrominance signals. In addition, the processor 120 may replace the pixel value of the first pixel 10 with index information indicating a pixel combination having a luminance signal most similar to the first luminance signal of the first pixel 10 among the plurality of luminance signals obtained based on the plurality of second pixels 20 located in the diagonal directions.

Returning to FIG. 1, the processor 120 according to an embodiment of the disclosure may obtain a third chrominance signal and a third luminance signal of a third pixel spaced apart from the first pixel 10 by one pixel. The processor 120 may identify at least one fourth pixel based on the third chrominance signal and fourth chrominance signals of pixels neighboring to the third pixel. The processor 120 may obtain a plurality of luminance signals according to a plurality of pixel combinations based on the at least one identified fourth pixel, and identify a luminance signal having a lowest difference value from the third luminance signal among the plurality of luminance signals. The processor 120 may replace a pixel value of the third pixel with index information indicating a pixel combination for obtaining the identified luminance signal. The processor 120 according to an embodiment may obtain an encoded image in which pixel values and pieces of index information are alternately disposed, as shown in FIG. 3, from the input image.

The processor 120 according to an embodiment of the disclosure may obtain αRGB information having 32 bits corresponding to each of the pixels neighboring to the first pixel 10 and obtain 28-bit αRGB information by applying gradation conversion to the obtained 32-bit αRGB information. For example, the processor 120 may convert data having a size of 8 bits into data having a size of 7 bits by rounding up or down pixel values of 0 to 255 of the R channel. As another example, the data may be converted into data having a size of 7 bits by converting the pixel values of 0 to 255 of the R channel into an odd value or an even value. This will be described in greater detail below with reference to FIG. 6.

Figure 6:
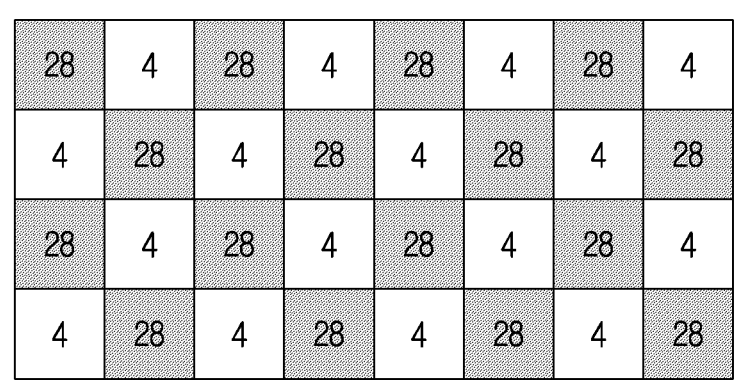

FIG. 6 is a diagram illustrating example encoding according to another embodiment of the disclosure.

Referring to FIG. 6, the processor 120 according to an embodiment may execute gradation conversion of data having a size of 8 bits of each of α, R, G, B channels into data having a size of 7 bits and obtain 28-bit αRGB information.

The processor 120 may obtain a second luminance signal and a second chrominance signal in a YCbCr (or YUV) format based on αRGB having a pixel value of 28 bits of the second pixels 20. The processor 120 may identify a similarity between the first chrominance signal of the first pixel 10 and the second chrominance signals of the second pixels 20.

The processor 120 according to an embodiment of disclosure may identify at least one second pixel having a similarity equal to or greater than a threshold value among second pixels 20 and obtain a plurality of luminance signals based on the identified second pixel.

The processor 120 may identify a luminance signal having a lowest difference value from the first luminance signal of the first pixel 10 among the plurality of luminance signals. The processor 120 may obtain index information indicating a method for obtaining the identified luminance signal or a location of the second pixel regarding the identified luminance signal. As another example, the index information may be information indicating a pixel combination according to the identified luminance signal.

The processor 120 according to an embodiment may replace the pixel value of the first pixel 10 with the obtained index information.

Referring to FIG. 6, the processor 120 may execute the gradation conversion in the input image, and accordingly, the processor 120 may obtain an encoded image in which the pixel values of 28 bits and the pieces of index information having 4 bits are alternately disposed. The obtained encoded image may have, for example, a compression rate of 50% with respect to the input image.

Returning to FIG. 1, when the number of pixels neighboring to the first pixel 10 is less than 3, the processor 120 according to an embodiment of the disclosure may maintain the pixel value of the first pixel 10. This will be described in greater detail below with reference to FIG. 7.

Figure 7:
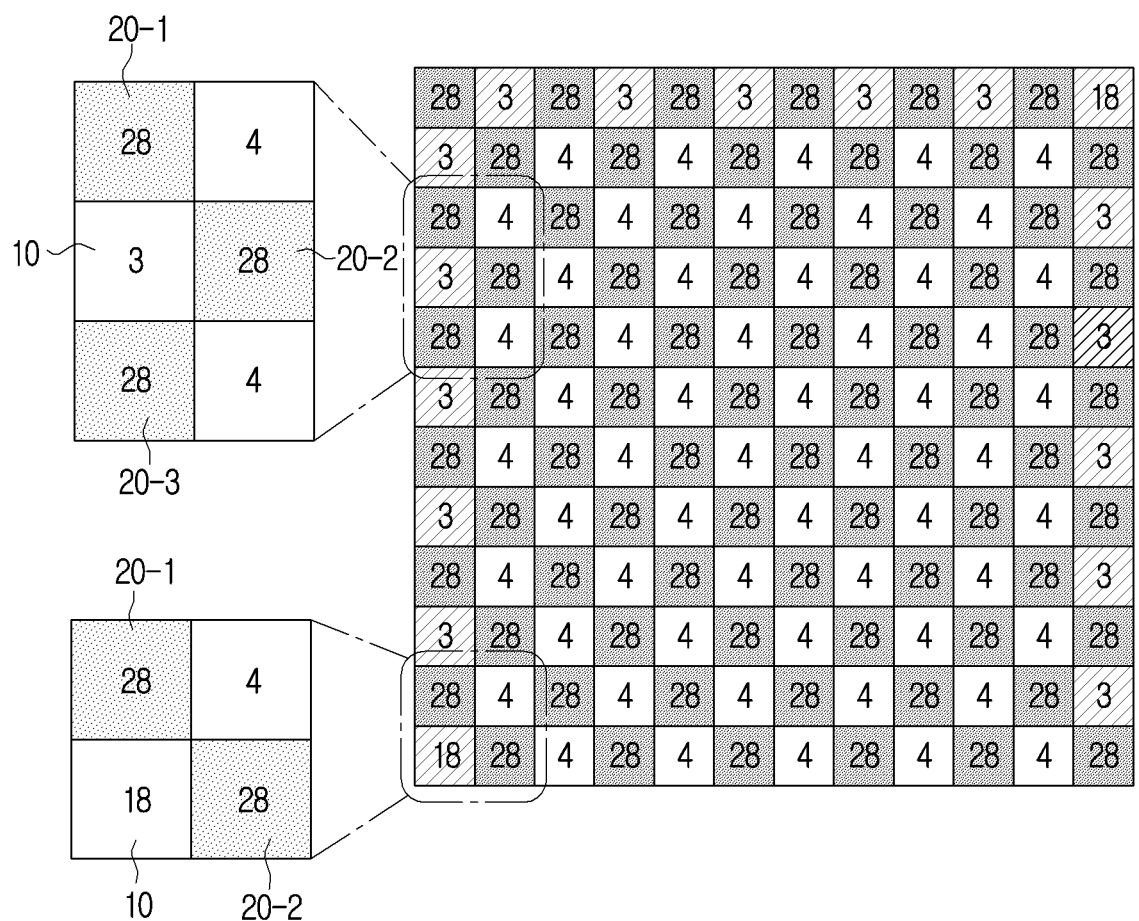
FIG. 7 is a diagram illustrating an example pixel and neighboring pixels according to an embodiment.

FIG. 7 is a diagram illustrating an example pixel and neighboring pixels according to an embodiment of the disclosure.

Referring to FIG. 7, the first pixel 10 located on an outermost portion among the plurality of pixels included in the input image may have three neighboring pixels. For example, pixels neighboring to the first pixel 10 may be the second pixel 20-1 located on an upper side, the second pixel 20-2 located on a right side, and the second pixel 20-3 located on a lower side.

According to an embodiment, when the three second pixels 20-1, 20-2, and 20-3 neighboring to the first pixel 10 include second chrominance signals having a similarity to the first chrominance signal of the first pixel 10 equal to or greater than a threshold value, the processor 120 may obtain a plurality of luminance signals according to a plurality of pixel combinations obtainable based on the three second pixels 20-1, 20-2, and 20-3. For example, the processor 120 may obtain 7 luminance signals in total which are a second luminance signal corresponding to each of the second pixels 20-1, 20-2, and 20-3, average luminance signals based on the two second pixels, and an average luminance signal of the three second pixels 20-1, 20-2, and 20-3. The processor 120 may identify any one luminance signal most similar to the luminance signal of the first pixel 10 among the 7 luminance signals. The processor 120 may obtain index information indicating a pixel combination corresponding to the identified luminance signal.

The index information may be data having a size of 3 bits ($2^3=8$), in order to indicate any one of the number of pixel combinations, that is, 7 pixel combinations obtainable based on the three second pixels 20-1, 20-2, and 20-3 neighboring to the first pixel 10.

When the number of pixels neighboring to the first pixel 10 is 3, the processor 120 according to an embodiment may replace the pixel value of the first pixel 10 with index information having a size of 3 bits.

As another example, when the number of pixels neighboring to the first pixel 10 is less than 3, the processor 120 may maintain the pixel value of the first pixel 10. As shown in FIG. 7, the first pixel 10 located at the corner (or edge) among the plurality of pixels included in the input image may have two neighboring pixels. For example, the pixels neighboring to the first pixel 10 may be the second pixel 20-1 located on an upper side and the second pixel 20-2 located on a right side.

In this case, the number of chrominance signals obtainable from the two second pixels 20-1 and 20-2 is two and the number of luminance signals is three and accordingly, the processor 120 may maintain the pixel value of the first pixel 10. This is merely an example and there is no limitation thereto. For example, regardless of the number of pixels neighboring to the first pixel 10, the processor 120 according to an embodiment may obtain index information indicating a method for obtaining a luminance signal having a minimum difference value from the first luminance signal of the first pixel 10 or a location of the second pixel 20 relating to the luminance signal having a minimum difference value, and replace the pixel value of the first pixel 10 with the identified index information.

Returning to FIG. 1, the processor 120 according to an embodiment of the disclosure may store the encoded image in the storage 110.

The processor 120 according to another embodiment of the disclosure may decode the encoded image stored in the storage 110.

The processor 120 according to an embodiment may identify a pixel including the index information among the plurality of pixels included in the encoded image. The processor 120 may identify at least one neighboring pixel among the pixels neighboring to the pixel based on the identified index information. As an example, the index information may indicate one pixel among the neighboring pixels. As another example, the index information may indicate at least two or more pixels among the neighboring pixels.

The processor 120 according to an embodiment may obtain chrominance information and luminance information from at least one neighboring pixel identified according to the index pixel, and replace the index information included in the pixel with the pixel value obtained based on the chrominance information and the luminance information.

As an example, the processor 120 may obtain index information included in the first pixel 10 in the encoded image. The processor 120 may identify at least one second pixel 20 corresponding to the index information among the neighboring pixels with respect to the first pixel 10. The processor 120 may obtain chrominance information and luminance information of the at least one identified second pixel 20. The processor 120 may replace the index information included in the first pixel 10 with the obtained chrominance information and luminance information. As another example, when the pixel combination corresponding to the index information includes at least two or more second pixels 20 among the neighboring pixels, the processor 120 may obtain an average chrominance signal and an average luminance signal of the second pixels 20. The processor 120 may replace the index information included in the first pixel 10 with the obtained average chrominance signal and average luminance signal and execute decoding. The index information may be information indicating any one combination among the plurality of pixel combinations obtainable based on the neighboring pixels.

Figure 2:
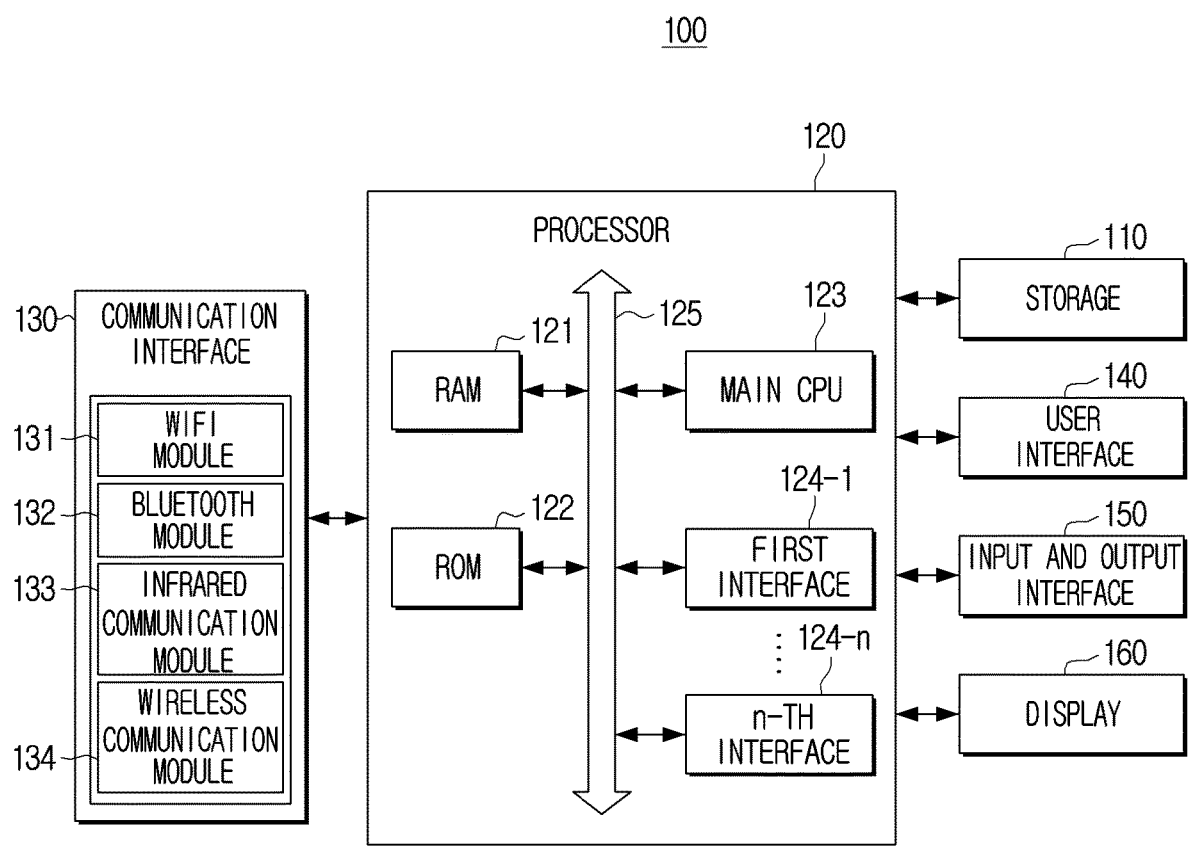
FIG. 2 is a block diagram illustrating an example configuration of an electronic apparatus according to an embodiment.

FIG. 2 is a block diagram illustrating an example configuration of the electronic apparatus according to an embodiment of the disclosure.

Referring to FIG. 2, the electronic apparatus 100 includes a communication interface (e.g., including communication circuitry) 130, the storage 110, the processor (e.g., including processing circuitry) 120, a user interface (e.g., including user interface circuitry) 140, an input and output interface (e.g., including input/output circuitry) 150, and a display 160. In the configuration shown in FIG. 2, the detailed description of the configuration overlapping with the configuration shown in FIG. 1 may not be repeated.

The storage 110 may be implemented as an internal memory such as a ROM (for example, electrically erasable programmable read-only memory (EEPROM) included in the memory 120 or implemented as a memory separated from the processor 120. In this case, the storage 110 may be implemented as a type of memory embedded in the electronic apparatus 100 or implemented as a type of memory detachable from the electronic apparatus 100 in accordance with data storage purpose. For example, in a case of data for driving the electronic apparatus 100, the data may be stored in a memory embedded in the electronic apparatus 100, and in a case of data for an extension function of the electronic apparatus 100, the data may be stored in a memory detachable from the electronic apparatus 100. The memory embedded in the electronic apparatus 100 may be implemented as at least one of a volatile memory (e.g., a dynamic RAM (DRAM), a static RAM (SRAM), or a synchronous dynamic RAM (SDRAM)) and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive, and a solid state drive (SSD)), and the memory which is detachable from the electronic apparatus 100 may be implemented in a form of a memory card (for example, a compact flash (CF), an secure digital (SD), a micro secure digital (micro-SD), a mini secure digital (mini-SD), an extreme digital (xD), or a multi-media card (MMC)), an external memory which may be connected to a USB port (for example, a USB memory), and the like.

For example, the storage 110 may store index information indicating each of the plurality of pixel combinations obtainable based on the pixels neighboring to one pixel.

In addition, the storage 110 according to an embodiment of the disclosure may store an encoded image, a decoded image, or an image received from an external apparatus in accordance with the control of the processor 120.

The processor 120 may include various processing circuitry and generally controls operations of the electronic apparatus 100 using various programs stored in the storage 110.

The processor 120 includes a RAM 121, a ROM 122, a main CPU 123, a first to n-th interfaces 124-1 to 124-n, and a bus 125.

The RAM 121, the ROM 122, the main CPU 123, and the first to n-th interfaces 124-1 to 124-n may be connected to each other through the bus 125.

The ROM 122 may store instruction sets for booting a system and the like. When a turn-on instruction is input and a power is supplied, the main CPU 123 copies the O/S stored in the storage 110 to the RAM 121 according to the instruction stored in the ROM 122 and operates the O/S to boot a system. When the booting is completed, the main CPU 123 may copies various application programs stored in the storage 110 to the RAM 121, executes the application programs copied to the RAM 121, and executes various operations.

The main CPU 123 accesses the storage 110 and executes the booting using the O/S stored in the storage 110. Various operations are executed using various programs, contents data, and the like stored in the storage 110.

The first to n-th interfaces 124-1 to 124-n are connected to various components described above. One of the interfaces may be a network interface connected to an external apparatus through network.

The processor 120 may execute a graphic processing function (video processing function). For example, the processor 120 may generate a screen including various objects such as icons, images, texts, and the like using a calculation unit (not shown) and a rendering unit (not shown). The calculation unit (not shown) may calculate an attribute value such as a coordinate value, a shape, a size, a color, or the like regarding the display of each object in accordance with a layout of the screen based on a received control instruction. The rendering unit (not shown) may generate a screen with various layouts including objects based on the attribute value calculated by the calculation unit (not shown). In addition, the processor 120 may execute various image processing such as decoding, scaling, noise filtering, frame rate conversion, resolution conversion, and the like with respect to video data.

The processor 120 may execute processing with respect to audio data. For example, the processor 120 may execute various processes such as decoding, amplification, noise filtering, and the like with respect to audio data.

The communication interface 130 has a configuration of executing communication with various types of external apparatus according to various types of communication system. The communication interface 130 may include various processing circuitry included in various communication modules, and may include, for example, and without limitation, a WiFi module 131, a Bluetooth module 132, an infrared communication module 133, and a wireless communication module 134. Each communication module may be implemented in a form of at least one hardware chip including various communication circuitry.

The processor 120 may execute communication with various external apparatuses using the communication interface 130. The external apparatus may include a display apparatus such as, for example, and without limitation, a TV, an image processing apparatus such as a set-top box, a control apparatus such as an external server or a remote control, an audio output apparatus such as a Bluetooth speaker, home appliances such as a lighting apparatus, a smart cleaner, a smart refrigerator, and the like, and a server such as IoT home manager.

The WiFi module 131 and the Bluetooth module 132 respectively execute communication in a WiFi system and a Bluetooth system. In a case of using the WiFi module 131 or the Bluetooth module 132, various pieces of connection information such as an SSID or session keys may be first transmitted and received to conduct the communication connection using these, and various pieces of information may be transmitted and received.

The infrared communication module 133 may execute communication in accordance with technologies of Infrared Data Association (IrDA) of wirelessly transmitting data in a near field using infrared light between visible light and millimeter waves.

The wireless communication module 134 may include at least one communication chip which executes communication in accordance to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), and the like, in addition to the communication system described above.

In addition, the communication interface 130 may include at least one of a local area network (LAN) module, an Ethernet module, or wired communication modules which execute communication using a pair cable, a coaxial cable, or a fiber-optic cable.

The communication interface 130 according to an example may use the same communication module (for example, WiFi module), in order to communicate with an external apparatus such as a remote control and an external server.

The communication interface 130 according to another example may use different communication module (for example, WiFi module), in order to communicate with an external apparatus such as a remote control and an external server. For example, the communication interface 130 may use at least one of an Ethernet module or a WiFi module in order to communicate with an external server, and use a BT module in order to communicate with an external apparatus such as a remote control. However, this is merely an embodiment, and the communication interface 130 may use at least one communication module among various communication modules, in a case of communicating with a plurality of external apparatuses or external servers.

The user interface 140 may include various user interface circuitry and be implemented as a device such as buttons, a touch pad, a mouse, and a keyboard, and implemented as a touch screen capable of executing both the display function described above and a manipulation input function. The button herein may be various types of buttons such as mechanical buttons, a touch pad, a wheel, and the like formed in an arbitrary region of a front portion, a side portion, or a rear portion of appearance of a main body of the electronic apparatus 100. It will be understood that the user interface circuitry described above is not limited to the above examples.

The input and output interface 150 may include various input/output circuitry and may be any interface including, for example, and without limitation, a High Definition Multimedia Interface (HDMI), a Mobile High-Definition Link (MHL), a Universal Serial Bus (USB), a Display Port (DP), a Thunderbolt, a Video Graphics Array (VGA) port, an RGB port, a D-subminiature (D-SUB), a Digital Visual Interface (DVI), or the like.

The input and output interface 150 may input and output at least one of an audio signal and a video signal.

According to an implementation example, the input and output interface 150 may include a port for inputting and outputting only an audio signal and a port for inputting and outputting a video signal as separate ports, or may be implemented as one port for inputting and outputting all of the audio signal and the video signal.

The electronic apparatus 100 may be implemented as an apparatus not including a display and may transmit an image signal to a separate display apparatus.

The electronic apparatus 100 may receive a user sound signal from an external apparatus including a microphone. In this case, the received user sound signal may be a digital sound signal or may be an analog sound signal according to the implement example. As an example, the electronic apparatus 100 may receive the user sound signal by a wireless communication method using Bluetooth or WiFi. The external apparatus may be implemented as a remote control apparatus or a smart phone.

In order to sound recognition of the sound signal received from an external apparatus, the electronic apparatus 100 may transmit the corresponding sound signal to an external server.

In this case, the communication modules for communication with an external apparatus and an external server may be implemented as one module or separate modules. For example, the communication with an external apparatus may be performed using a Bluetooth module, and the communication with an external server may be performed using an Ethernet modem or a WiFi modem.

The display 160 may provide various contents screens which may be provided through the electronic apparatus 100. The contents screen may include screens of various contents such as, for example, and without limitation, images, videos, texts, music, application execution screens including various contents, graphic user interface (GUI) screen, and the like.

The display 160 may be implemented in various forms such as, for example, and without limitation, a liquid crystal display (LCD), an organic light-emitting diode (OLED), a Liquid Crystal on Silicon (LCoS), a Digital Light Processing (DLP), a Micro LED, a quantum dot (QD) display panel, and the like, but there is no limitation thereto. In addition, the display may be implemented as a flexible display or a transparent display in some cases.

In addition, the display 160 according to an embodiment of the disclosure may include a bezel housing a display panel, in addition to a display panel for outputting an image. For example, the bezel according to an embodiment of the disclosure may include a touch sensor (not shown) for detecting a user interaction.

The display 160 included in the electronic apparatus 100 may display various screens generated by a graphic processing unit. The electronic apparatus 100 may include the display as a component, but may also transmit a signal corresponding to a screen to an external apparatus connected through an interface (not shown) and display various screens through a display of an external apparatus.

The electronic apparatus 100 may additionally include a tuner or a demodulation unit according to the implement example.

A tuner (not shown) may tune a channel selected by a user or all of channels stored in advance and receive Rf broadcast signals among radio frequency (RF) broadcast signals received through antenna.

A demodulation unit (not shown) may receive and demodulate a digital IF signal (DIF) converted by the tuner and may execute channel decoding.

Figure 8:
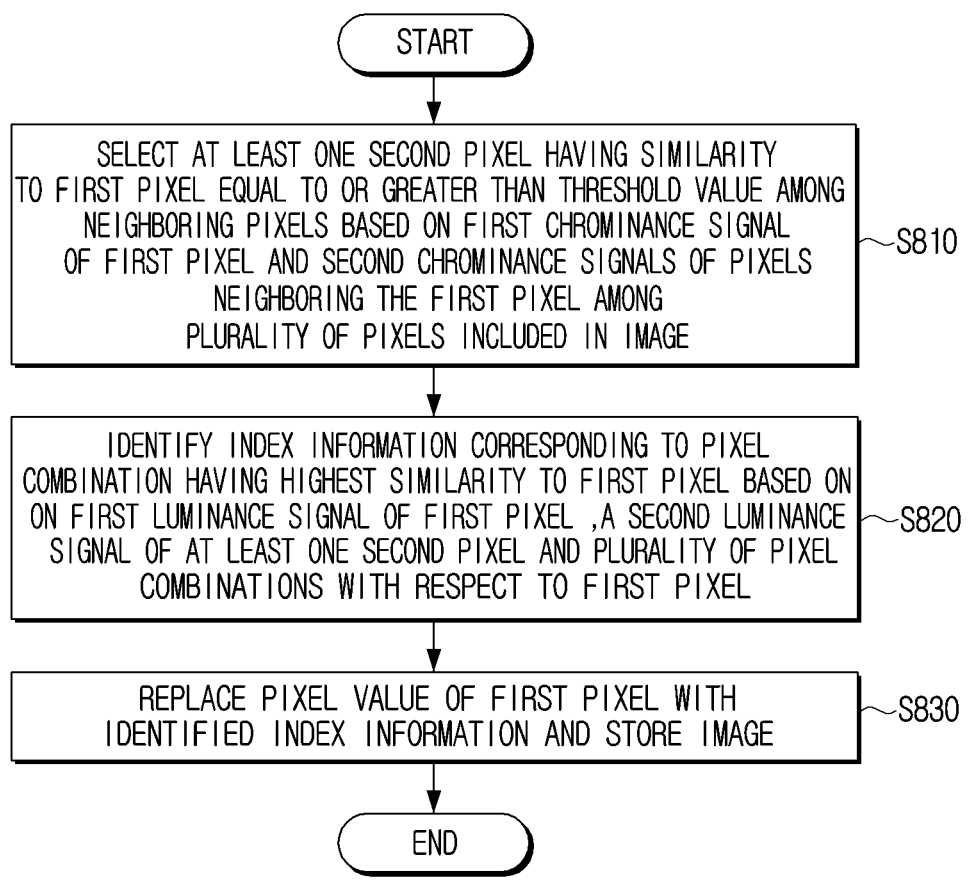
FIG. 8 is a flowchart illustrating an example method of controlling an electronic apparatus according to an embodiment.

FIG. 8 is a flowchart illustrating an example method of controlling an electronic apparatus according to an embodiment of the disclosure.

In a control method of an electronic apparatus including index information indicating each of a plurality of combinations obtainable based on neighboring pixels with respect to a pixel according to an embodiment of the disclosure, at least one second pixel having a similarity to a first pixel equal to or greater than a threshold value is selected among the neighboring pixels, based on a first chrominance signal of a first pixel and second chrominance signals of pixels neighboring the first pixel among a plurality of pixels included in an image (S810).

Image information corresponding to a pixel combination having a highest similarity to the first pixel is identified based on a first luminance signal of the first pixel, a second luminance signal of the at least one second pixel, and a plurality of pixel combinations with respect to the first pixel (S820).

A pixel value of the first pixel is replaced with the identified index information and an image is stored (S830).

The step S820 of identifying index information may include a step of obtaining a plurality of luminance signals according to a plurality of pixel combinations based on the at least one second pixel, and a step of identifying a luminance signal having a lowest difference value from the first luminance signal of the first pixel among the plurality of luminance signals, and in the step of S830 of storing an image, the pixel value of the first pixel may be replaced with index information corresponding to the identified luminance signal and an image may be stored.

In the step of obtaining a plurality of luminance signals, a second luminance signal of each of the second pixels and an average luminance signal of the plurality of second pixels may be obtained as the plurality of luminance signals.

In addition, the step S820 of identifying index information may include a step of obtaining information indicating a pixel combination for obtaining the identified luminance signal based on the index information.

The neighboring pixels according to an embodiment may include a plurality of second pixels located on upper, lower, right, and left sides or in diagonal directions with respect to the first pixel.

In the step S820 of obtaining a plurality of luminance signals, based on the plurality of second pixels having a similarity equal to or greater than a threshold value including four pixels, an average luminance signal of the four second pixels, an average luminance signal of three second pixels among the four second pixels, an average luminance signal of two second pixels among the four second pixels, and a luminance signal corresponding to each of the four second pixels may be obtained as the plurality of luminance signals. The index information according to an embodiment may be information indicating each of the plurality of pixel combinations which are 15 at most.

The control method according to an embodiment may include a step of obtaining a third chrominance signal and a third luminance signal of a third pixel spaced apart from the first pixel by one pixel, a step of identifying at least one fourth pixel based on the third chrominance signal and fourth chrominance signals of pixels neighboring to the third pixels, a step of obtaining a plurality of luminance signals according to the plurality of pixel combinations based on the at least one fourth pixel, a step of identifying a luminance signal having a lowest difference value from the third luminance signal among the plurality of luminance signals, and a step of replacing a pixel value of the third pixel with information indicating a pixel combination for obtaining the identified luminance signal.

When a number of pixels neighboring the third pixel is less than 3, a step of maintaining the pixel value of the third pixel may be included.

The control method according to an embodiment may include a step of obtaining 32-bit αRGB information corresponding to each of the neighboring pixels, and a step of obtaining 28-bit αRGB information by applying gradation conversion to each of the αRGB information. The second chrominance signals and the second luminance signals corresponding to the neighboring pixels may be αYCbCr information obtained based on the 28-bit αRGB information, and the index information may be 4-bit information indicating a pixel combination having a highest similarity to the first pixel.

Figure 9:
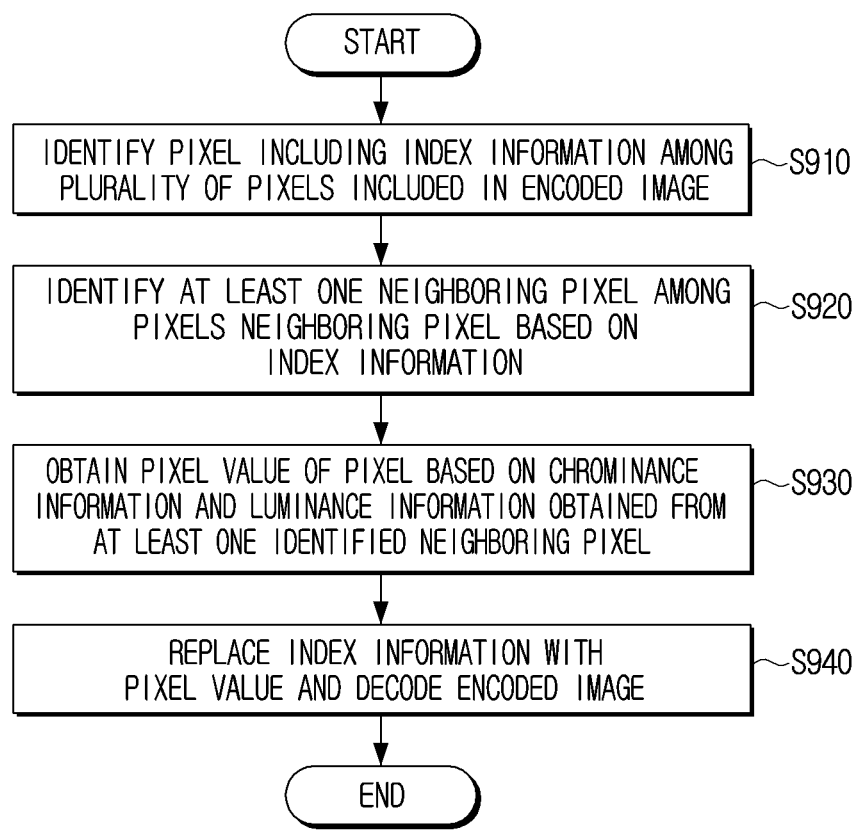
FIG. 9 is a flowchart illustrating an example method of controlling an electronic apparatus according to another embodiment.

FIG. 9 is a flowchart illustrating an example method of controlling an electronic apparatus according to another embodiment of the disclosure.

In the control method according to an embodiment of the disclosure, a pixel including index information is identified among a plurality of pixels included in an encoded image (S910).

At least one neighboring pixel may be identified among pixels neighboring a pixel based on the index information (S920).

A pixel value of the pixel may be obtained based on chrominance information and luminance information obtained from the at least one identified neighboring pixel (S930).

The index information may be replaced with the pixel value and the encoded image may be decoded (S940).

The index information may be information indicating at least one combination among a plurality of pixel combinations obtainable based on the neighboring pixels.

The methods according to various embodiments of the disclosure described above may be implemented in a form of application installable in existing electronic devices.

The method according to various embodiments of the disclosure described above may be implemented with software upgrade or hardware upgrade of existing electronic devices.

In addition, various embodiments of the disclosure described above may be executed through an embedded server included in an electronic apparatus or an external server of at least one of an electronic device or a display device.

According to an embodiment of the disclosure, various embodiments described hereinabove may be implemented as software including instructions stored in machine (e.g., computer)-readable storage media. The machine may include an apparatus which invokes commands stored in the storage medium and operates according to the invoked instructions, and may include an electronic apparatus (e.g., electronic device A) according to the disclosed embodiments. In a case where the instruction is executed by a processor, the processor may execute a function corresponding to the command directly or using other components under the control of the processor. The instruction may include a code made by a compiler or a code executable by a compiler. The machine-readable storage medium may be provided in a form of a non-transitory storage medium. The "non-transitory" storage medium may be tangible and may not include signals, and may not distinguish that data is semi-permanently or temporarily stored in the storage medium.

In addition, according to an embodiment of the disclosure, the methods according to various embodiments described above may be provided to be included in a computer program product. The computer program product may be traded between a merchandiser and a purchaser as a commercially available product. The computer program product may be in a form of a compact disc read only memory (CD-ROM) or distributed online through an application store (e.g., Play Store™). In a case of the online distribution, at least a part of the computer program product may be temporarily stored or temporarily generated at least in a storage medium such as a memory of a server of a manufacturer, a server of an application store, or an intermediate server.

In addition, each of components (e.g., module or program) according to various embodiments described above may be configured with a single or a plurality of individuals, some subcomponents may be omitted among the subcomponents described above, or other subcomponents may be further included in various embodiments. Generally and additionally, some components (e.g., module or program) may be integrated as one individual and may execute the functions executed by each of the corresponding component before the integration, in the same or similar manner. The operations executed by a module, a program, or other components according to various embodiments may be executed in a sequential, parallel, repetitive, or heuristic manner, at least some operations may be executed in a different order or omitted, or other operations may be added.

While various example embodiments of the disclosure have been illustrated and described, the disclosure is not limited to specific embodiments described above. It will be understood by one of ordinary skill in the art that various changes in form and detail may be made without departing from the spirit and scope of the disclosure including the appended claims and their equivalents.

What is claimed is:

1. An electronic apparatus comprising:
    a storage storing index information indicating each of a plurality of pixel combinations obtainable based on neighboring pixels with respect to a pixel; and
    a processor configured to:
        based on a first chrominance signal of a first pixel and second chrominance signals of pixels neighboring the first pixel among a plurality of pixels included in an input image, select at least one second pixel having a similarity to a first pixel equal to or greater than a threshold value among neighboring pixels,
        identify a pixel combination having a highest similarity to the first pixel from among a plurality of pixel combinations based at least on the selected at least one second pixel,
        identify index information corresponding to the identified pixel, and a plurality of pixel combinations, and
        control the electronic apparatus to store the image by replacing a pixel value of the first pixel with the identified index information.

2. The apparatus according to claim 1, wherein the processor is configured to: obtain a plurality of luminance signals according to the plurality of pixel combinations based on the at least one second pixel, identify a luminance signal having a lowest difference value from the first luminance signal of the first pixel among the plurality of luminance signals, and encode the input image by replacing a pixel value of the first pixel with the index information corresponding to the identified luminance signal.

3. The apparatus according to claim 2, wherein the processor is configured to obtain a second luminance signal of each of the second pixels and an average luminance signal of the plurality of second pixels as the plurality of luminance signals.

4. The apparatus according to claim 2, wherein the processor is configured to: obtain information indicating a pixel combination for obtaining the identified luminance signal based on the index information, and replace a pixel value of the first pixel with the information.

5. The apparatus according to claim 1, wherein the neighboring pixels include a plurality of second pixels located on upper, lower, right, and left sides of the first pixel or a plurality of second pixels located in diagonal directions of the first pixel.

6. The apparatus according to claim 5, wherein, the processor is configured to obtain an average luminance signal of four second pixels based on the plurality of second pixels having a similarity equal to or greater than a threshold value including four pixels, an average luminance signal of three second pixels among the four second pixels, an average luminance signal of two second pixels among the four second pixels, and a luminance signal corresponding to each of the four second pixels, as the plurality of luminance signals, and
    wherein the index information includes information indicating each of the plurality of pixel combinations, wherein the plurality of pixel combinations are not more than 15.

7. The apparatus according to claim 1, wherein the processor is configured to: obtain a third chrominance signal and a third luminance signal of a third pixel spaced apart from the first pixel by one pixel, identify at least one fourth pixel based on the third chrominance signal and fourth chrominance signals of pixels neighboring the third pixel, obtain a plurality of luminance signals according to the plurality of pixel combinations based on the at least one fourth pixel, identify a luminance signal having a lowest difference value from the third luminance signal among the plurality of luminance signals, and replace a pixel value of the third pixel with information indicating a pixel combination for obtaining the identified luminance signal.

8. The apparatus according to claim 7, wherein, based on a number of pixels neighboring to the third pixel being less than 3, the processor is configured to maintain the pixel value of the third pixel.

9. The apparatus according to claim 1, wherein the processor is configured to: obtain 32-bit αRGB information corresponding to each of the neighboring pixels, and obtain 28-bit αRGB information by applying gradation conversion to each of the αRGB information,
    wherein the second chrominance signals and the second luminance signals corresponding to the neighboring pixels include αYCbCr information obtained based on the 28-bit αRGB information, and
    wherein the index information includes 4-bit information indicating a pixel combination having a highest similarity to the first pixel.

10. An electronic apparatus comprising:
    a storage storing an encoded image; and
    a processor configured to:
    identify a pixel including index information among a plurality of pixels included in the encoded image,
    identify at least one neighboring pixel among pixels neighboring the pixel based on the index information,
    obtain a pixel value of the pixel based on chrominance information and luminance information obtained from the at least one identified neighboring pixel, and
    decode the encoded image by replacing the index information with the pixel value.

11. The apparatus according to claim 10, wherein the index information includes information indicating any one combination among a plurality of pixel combinations obtainable based on the neighboring pixels.

12. A method of controlling an electronic apparatus including index information indicating each of a plurality of pixel combinations obtainable based on neighboring pixels with respect to a pixel, the method comprising:
- based on a first chrominance signal of a first pixel and second chrominance signals of pixels neighboring the first pixel among a plurality of pixels included in an input image selecting at least one second pixel having a similarity to a first pixel equal to or greater than a threshold value among neighboring pixels;
- identifying a pixel combination having a highest similarity to the first pixel from among a plurality of pixel combinations based at least on the selected at least one second pixel,
- identifying index information corresponding to the identified pixel combination, and
- storing the image by replacing a pixel value of the first pixel with the identified index information.

13. The method according to claim 12, wherein the identifying index information comprises: obtaining a plurality of luminance signals according to the plurality of pixel combinations based on the at least one second pixel; and identifying a signal having a lowest difference value from the first luminance signal of the first pixel among the plurality of luminance signals,
   wherein the storing the image comprises storing the image by replacing a pixel value of the first pixel with the index information corresponding to the identified luminance signal.

14. The method according to claim 13, wherein the obtaining a plurality of luminance signals comprises obtaining a second luminance signal of each of the second pixels and an average luminance signal of the plurality of second pixels as the plurality of luminance signals.

15. The method according to claim 13, wherein the identifying index information comprises obtaining information indicating a pixel combination for obtaining the identified luminance signal based on the index information.

16. The method according to claim 12, wherein the neighboring pixels include a plurality of second pixels located on upper, lower, right, and left sides of the first pixel, or a plurality of second pixels located in diagonal directions of the first pixel.

17. The method according to claim 16, wherein the obtaining a plurality of luminance signals comprises, based on the plurality of second pixels having a similarity equal to or greater than a threshold value including four pixels, obtaining an average luminance signal of the four second pixels, an average luminance signal of three second pixels among the four second pixels, an average luminance signal of two second pixels among the four second pixels, and a luminance signal corresponding to each of the four second pixels, as the plurality of luminance signals, and
   wherein the index information includes information indicating each of the plurality of pixel combinations, wherein the plurality of pixel combinations are not more than 15.

18. The method according to claim 12, further comprising:
- obtaining a third chrominance signal and a third luminance signal of a third pixel spaced apart from the first pixel by one pixel;
- identifying at least one fourth pixel based on the third chrominance signal and fourth chrominance signals of pixels neighboring the third pixel;
- obtaining a plurality of luminance signals according to the plurality of pixel combinations based on the at least one fourth pixel;
- identifying a luminance signal having a lowest difference value from the third luminance signal among the plurality of luminance signals; and
- replacing a pixel value of the third pixel with information indicating a pixel combination for obtaining the identified luminance signal.

19. The method according to claim 18, further comprising:
- based on a number of pixels neighboring to the third pixel being less than 3, maintaining the pixel value of the third pixel.

20. The method according to claim 12, further comprising:
- obtaining 32-bit $\alpha$RGB information corresponding to each of the neighboring pixels; and
- obtaining 28-bit $\alpha$RGB information by applying gradation conversion to each of the $\alpha$RGB information,
- wherein the second chrominance signals and the second luminance signals corresponding to the neighboring pixels include $\alpha$YCbCr information obtained based on the 28-bit $\alpha$RGB information, and
- wherein the index information includes 4-bit information indicating a pixel combination having a highest similarity to the first pixel.

* * * * *